United States Patent
Cavin et al.

(10) Patent No.: US 9,668,506 B2
(45) Date of Patent: Jun. 6, 2017

(54) POWDER FOR COLORING A FOOD PRODUCT WHEN HEATED

(71) Applicant: NESTEC S.A., Vevey (CH)

(72) Inventors: Sandrine Cavin, Epalinges (CH); Mawele Shamaila, Singen (DE); Jonas Halden, Aurora, OH (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/436,533

(22) PCT Filed: Oct. 17, 2013

(86) PCT No.: PCT/EP2013/071700
§ 371 (c)(1),
(2) Date: Apr. 17, 2015

(87) PCT Pub. No.: WO2014/060505
PCT Pub. Date: Apr. 24, 2014

(65) Prior Publication Data
US 2015/0282514 A1    Oct. 8, 2015

Related U.S. Application Data

(60) Provisional application No. 61/716,021, filed on Oct. 19, 2012.

(51) Int. Cl.
| | | |
|---|---|---|
| A23L 1/272 | (2006.01) | |
| A21D 15/02 | (2006.01) | |
| A21D 17/00 | (2006.01) | |
| A23P 10/40 | (2016.01) | |
| A23P 20/12 | (2016.01) | |
| A23L 5/10 | (2016.01) | |
| A23L 5/30 | (2016.01) | |
| A23L 5/41 | (2016.01) | |
| A23L 5/43 | (2016.01) | |
| A21D 13/24 | (2017.01) | |
| A21D 13/28 | (2017.01) | |

(52) U.S. Cl.
CPC .............. *A23L 1/272* (2013.01); *A21D 13/24* (2017.01); *A21D 13/28* (2017.01); *A21D 15/02* (2013.01); *A21D 17/006* (2013.01); *A23L 5/15* (2016.08); *A23L 5/34* (2016.08); *A23L 5/41* (2016.08); *A23L 5/43* (2016.08); *A23P 10/40* (2016.08); *A23P 20/12* (2016.08); *A23V 2002/00* (2013.01)

(58) Field of Classification Search
CPC ........ A23L 1/272; A23L 1/0255; A23L 1/005; A23L 5/15; A23L 5/34; A23L 5/41; A23L 5/43; A21D 13/0016; A21D 15/02; A21D 17/006; A21D 13/24; A21D 13/28; A23P 10/40; A23P 20/12
See application file for complete search history.

(56) References Cited

U.S. PATENT DOCUMENTS

| | | | | |
|---|---|---|---|---|
| 4,861,601 A | * | 8/1989 | Seneau | A21D 15/02 426/19 |
| 4,946,699 A | * | 8/1990 | Kageyama | A21D 6/001 426/19 |
| 2004/0137124 A1 | | 7/2004 | Tricoit et al. | |
| 2009/0081335 A1 | * | 3/2009 | Ortiz | A21D 13/0022 426/94 |

FOREIGN PATENT DOCUMENTS

| | | |
|---|---|---|
| EP | 0481249 | 4/1992 |
| EP | 2127524 | 12/2009 |
| JP | 2005218330 | 8/2005 |
| JP | 2012085620 | 5/2012 |
| KR | 20110039756 | 4/2011 |
| WO | 2013037603 | 3/2013 |
| WO | 2013037604 | 3/2013 |
| WO | 2013068139 | 5/2013 |

* cited by examiner

*Primary Examiner* — Anthony Weier
(74) *Attorney, Agent, or Firm* — K&L Gates LLP

(57) ABSTRACT

The present invention relates to a powder for coloring a food product or a food product surface when heated, the powder having a plant extract, a chemical base, and a carrier; wherein the plant extract includes a compound with at least one aromatic ring having at least two hydroxyl groups borne by two adjacent carbon atoms of that aromatic ring. Further aspects of the invention are the use of said powder for coloring a food product when heated for example in a microwave oven and to food products having said powder.

12 Claims, 2 Drawing Sheets

| | | | | |
|---|---|---|---|---|
| Trial 1 | White flour | 9 g | L*: 83.00 | <br>Microwaved 1'20" at 600W |
| | Rosemary extract | 0.15 g | a*: 1.26 | |
| | Sodium bicarbonate | 0.85 g | b*: 30.3 | |
| Trial 2 | White flour | 9 g | L*: 79.8 | <br>Microwaved 1'20" at 600W |
| | Rosemary extract | 0.5 g | a*: 2.73 | |
| | Sodium bicarbonate | 0.85 g | b*: 35.00 | |
| Trial 3 | White flour | 8 g | L*: 74.2 | <br>Microwaved 1'20" at 600W |
| | Rosemary extract | 1.0 g | a*: 6.29 | |
| | Sodium bicarbonate | 1.0 g | b*: 37.9 | |
| Trial 4 | White flour | 8 g | L*: 69.00 | <br>Microwaved 1'20" at 600W with a susceptor |
| | Rosemary extract | 1.0 g | a*: 9.44 | |
| | Sodium bicarbonate | 1.0 g | b*: 43.2 | |

| | Frozen state | 1'40 at 750W | Frozen state | 1'30 at 750 W over a susceptor |
|---|---|---|---|---|
| | Dough bun | | Toast bread | |
| No metal addition | <br>L* : 89.2 ± 0.5<br>a* : 2.5 ± 0.4<br>b* : 19.7 ± 0.9 | <br>L* : 83.8 ± 2.0<br>a* : 3.6 ± 0.9<br>b* : 26.7 ± 0.9 | <br>L* : 85.2 ± 0.4<br>a* : 3.6 ± 0.3<br>b* : 19.8 ± 0.9 | <br>L* : 66.4 ± 1.8<br>a* : 12.6 ± 0.7<br>b* : 34.2 ± 1.8 |
| Addition of $ZnSO_4 \cdot 7H_2O$ | <br>L* : 88.5 ± 0.9<br>a* : 2.7 ± 0.6<br>b* : 21.4 ± 1.3 | <br>L* : 83.6 ± 1.7<br>a* : 3.7 ± 1.0<br>b* : 27.1 ± 2.1 | Not determined | Not determined |

POWDER FOR COLORING A FOOD PRODUCT WHEN HEATED

CROSS REFERENCE TO RELATED APPLICATIONS

The present application is a National Stage of International Application No. PCT/EP2013/071700, filed on Oct. 17, 2013, which claims priority to U.S. Provisional Patent Application No. 61/716,021, filed on Oct. 19, 2012, the entire contents of which are being incorporated herein by reference.

The present invention relates to a powder for coloring a food product, the powder comprising a plant extract which comprises a compound with at least one aromatic ring having at least two hydroxyl groups borne by two adjacent carbon atoms of that aromatic ring, a chemical base and a carrier. Further aspects of the invention are the use of said powder for coloring a food product when heated for example in a microwave oven and to food products comprising said powder.

The usage of microwave ovens in homes has increased significantly in recent years and continues to increase. While microwave cooking of foods affords a significant time saving over conventional oven cooking, it suffers from the disadvantage that food products cooked by microwave energy lack the desired degree of surface browning, that particularly those products have that have a crust, such as pies, pizzas, bread, dough's etc. when cooked in a conventional oven.

The most common reaction responsible for surface browning during cooking of products having a dough crust is the well-known Maillard reaction (i.e. non-enzymatic browning). This reaction occurs between naturally occurring reducing sugars and compounds containing an amino group, e.g. amino acids, peptides and proteins, and results in the formation of colored melanoidins. The rate at which the Maillard reaction proceeds to form such colored pigments increases significantly with temperature and time. When foods containing a dough crust, such as for example a frozen pizza, a bread or a snack, are heated in a conventional oven, the crust is heated to considerably higher temperatures than the interior of the food product, with the high surface temperatures being sufficient to achieve the desired browning at the food surface.

However, in microwave heating the heat energy is released internally within the food product so that the surface remains at a relatively even temperature with the interior. There is a lack of hot, dry air surrounding the food product during microwave cooking. In addition, the food is usually cooked for a much shorter time. Consequently, the high surface temperatures necessary to achieve browning are not reached within the time required to bake the food product. The surface of the product remains moist and pale: the desired development of a nice brown surface color does not appear. The end-product, although well cooked, is often perceived as under-cooked by the consumer.

A number of compositions have been proposed to create a desirable browned surface of a food product when heated by microwave energy. Such prior microwave browning compositions typically are based on the Maillard reaction to effect browning, and include one or more components which permit the reaction to take place at lower temperatures or which increase the reaction rate. Such compositions typically include carbohydrates such as for example dextrose, maltodextrin and acetaldehyde compounds which result from pyrolysis of some of the sugar compounds prior to constitution of the browning composition (see U.S. Pat. No. 5,756,140). However, none of these prior compositions have been entirely satisfactory due to flavor concerns, the limitation of achievable color variations on a food product, and costs. Further, the presence of acetaldehydes and potentially still other compounds from the pyrolysis process may be perceived as less natural by consumers.

EP0481249 proposes a method to use an amount of water soluble tea solids applied to a food surface to develop a browned surface on the crust of such a food when heated by microwave energy. The shortcoming of the proposed method is that food products treated with such soluble tea solids retain a distinct flavor and taste of black tea. For most product applications, this is clearly not desired. It is believed that this significant flavor impact is due to the fact that a relatively high concentration of tea solids is needed to be applied to the food surface in order to be effective for the development of a desired surface coloration. A further major inconvenience of the application is that the food surface remains moist and soft. Hence, this solution does not provide the consumer with the impression of a well-cooked product with a well-developed crust.

Currently on the market and commercially used is "Liquid or powder Smoke" (Red Arrow Products Company LLC, Manitowoc, Wis., USA). "Liquid or Powder Smoke" overcomes the currently missing solution for fast browning of food surfaces in microwave applications. However, "Liquid or powder Smoke" may not be well perceived by consumers. It contains aldehydes which have to be labeled on the packaging of the food products. Currently, the EFSA (European Food Safety Authority) is investigating the safety of "Liquid and Powder Smoke" as a food flavoring agent.

Hence, there is a clear need in the art to replace these potentially hazardous substances with natural, safe compositions which can effectively be used on food products for inducing coloration of a food product when heated for example in a microwave oven. Further, these compositions should be odorless or at least not having a negative impact on the final flavor of such a treated food product.

The object of the present invention is to provide an improved solution for coloring a food product, and particularly a food product surface, upon heating the food product for example in a microwave oven, and which overcomes at least some of the inconveniences described above.

The object of the present invention is achieved by the subject matter of the independent claims. The dependent claims further develop the idea of the present invention.

Accordingly, the present invention pertains to a powder for coloring a food product or a food product surface when heated, the powder comprising
 a plant extract,
 a chemical base, and
 a carrier,
wherein the plant extract comprises a compound with at least one aromatic ring having at least two hydroxyl groups borne by two adjacent carbon atoms of that aromatic ring.

A second aspect of the invention relates to a use of the powder of claim 1 for coloring a food product or a food product surface when heated.

A third aspect of the invention is a method for coloring a food product or a food product surface comprising the steps of adding the powder according to claim 1 to the food product or food product surface and thereafter heating the food product or food product surface in an oven, preferably in a microwave oven.

In a still further aspect, the invention pertains to a food product comprising the powder of claim 1.

The inventors surprisingly found that appealing brownish colors develop in and/or on a food product which has been prepared or treated with a powder comprising a plant extract which contains a compound with at least one aromatic ring having at least two hydroxyl groups borne by two adjacent carbon atoms of that aromatic ring, a chemical base and a carrier, preferably flour, upon heating of said food product in an oven, preferably a microwave oven. Thereby, the powder of the invention can be used in the direct preparation of a food product, e.g. as a flour ingredient for making a dough product, or be applied to a surface of a food product, e.g. by dispersing said powder onto the top of a prepared pasta or potato dish to be heated in a microwave oven. Alternatively, the powder may be admixed to flour which is used to cover a surface of a pre-baked chilled or frozen dough product, as e.g. for a pre-baked pizza dough, to prevent sticking of such a dough to its packaging material. Once unpacked by a consumer and heated in a microwave oven, a nice brown color rapidly develops at the crust or surface of said product, providing the microwave heated product with an aspect of a truly well oven-cooked product.

Advantageously, the powder of the invention can be applied to any un- or prebaked, chilled or frozen food product, for which it is desired that it develops a brown color of the product itself or its crust upon baking preferably in a microwave oven. The powder is an all natural product and allows a very versatile and easy to use application. It is of great advantage that the present invention is a completely natural solution and that there are no safety concerns to consumers. Furthermore, food products comprising the powder of the invention do not have and/or do not develop negatively perceived off-flavors or odors either before or after the heat treatment. Furthermore, as the powder of the invention is dry, it can be applied to all sorts of food products and/or food product surfaces, including wet, moist, soft or frozen surfaces. As the powder can be applied directly and in dry form, there is no need to add further liquidity to such a product surface as with the conventionally known solutions, and thereby possibly compromising the general aspect of a dry, well baked food crust or surface after baking. To the contrary, the dry powder of the invention may even absorb some of the humidity of the un-baked food surface and thereby further improve the aspect of crispiness of said surface after baking. A still further advantage is that the powder of the invention can be applied or sprinkled to a food surface in a non-homogeneous way, providing said surface with an aspect of a more natural, irregular browning reaction upon baking.

DETAILED DESCRIPTION OF THE INVENTION

Figure 1:
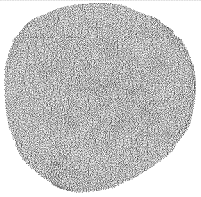
FIG. 1: Browning reaction of cookie dough surfaces comprising the powder of the invention after baking in a microwave oven.
Figure 1:
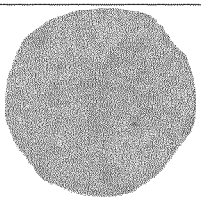
Figure 1:
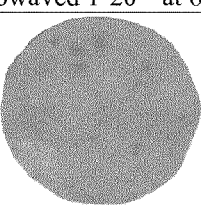
Figure 1:
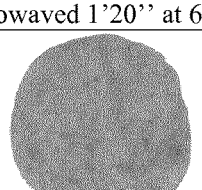

The present invention pertains to a powder for coloring a food product, the powder comprising a plant extract comprising a compound with at least one aromatic ring having at least two hydroxyl groups borne by two adjacent carbon atoms of that aromatic ring, a chemical base and a carrier. Preferably, the compound is an ortho-dihydroxy phenol derivative.

"Coloring a food product" as of the invention pertains to coloring the food product per se and/or coloring the surface of said food product or at least a part thereof.

In a preferred embodiment, the compound of the powder of the invention is a phenolic acid or a polyphenol, for example a flavanol or a flavonol. Thereby it is of an advantage that such phenolic and polyphenolic compounds naturally occur in nature and specifically in many fruits, vegetables and herbs which are safely consumed by humans and/or animals since hundreds of years. Those compounds are well recognized by consumers and also by legislators world-wide as food grade and safe to consume.

Preferably, the compound according to the invention is selected from the group consisting of catechin, epicatechin, (epi)catechin-gallate, caffeic acid, chlorogenic acid, rosmarinic acid, quercetin, caftaric acid and rutin. The compound may also comprise combinations of one or several of these preferred polyphenols.

It is of an advantage that extracts from such plants, for example from their fruits, leaves or roots can be used as a natural source thereof. Thereby, the said compounds can be extracted and with that also purified to some extend from those plant materials. The crude extracts or just the partly or completely purified compounds from those sources can be used as a plant extract in the powder of the invention. An advantage of using partly or completely purified compounds as plant extracts is that the concentration of the compound in the plant extract can be increased. Thereby, the effect and intensity of the expected colour reaction can be increased and is more predictable. Possible 'side-effects' which may be generated by whole crude plant extracts may be minimized or even eliminated in this way. Such 'side-effects' may be due to an undesired coloration of the plant extract as such which could be eliminated, and/or possible off-effects on taste and aroma affecting the treated product. Furthermore, compounds purified from a plant extract and which were not produced synthetically may have a production cost advantage and may be better accepted by consumers as more natural. Preferably, the plant extract comprises the compound in an amount of 4-70 wt %, preferably of 10-50 wt % (i.e. % by dry weight).

Preferably, the plant extract is an extract from a plant selected from the group consisting of tea, grape seed, onion, coffee, artichoke, chicory, rosemary, oregano, basil, apple, eggplant, grape, pear, plum, potato, sunflower, and combinations thereof. Those plants are all rich in either a flavanol, flavonol and/or a phenolic acid. Further, they are all well accepted by consumers as food products themselves. They are food grade and safe to consume.

The powder of the invention comprises a chemical base, wherein the chemical base is selected from the group consisting of sodium bicarbonate, sodium or potassium hydroxide and calcium carbonate. Thereby, the chemical base is a powder itself comprised in the powder of the invention. Preferably, the chemical base is encapsulated and in powder form.

The use of a chemical base together with the compound has the advantage of accelerating the development of the desired color reaction. Thereby, the color appearance develops faster and more intense upon heating of the treated product. Further, using a developer such as a chemical base allows reducing the amount of the said phenolic or polyphenolic compounds necessary for reaching the desired food coloring effect after the heating step.

The powder of the invention further comprises a carrier, wherein the carrier is a flour. Preferably, the flour is selected from the group consisting of wheat, corn, rice, maize, buckwheat, chestnut, quinoa and soy flour.

The invention pertains to a powder, wherein the compound is present in an amount of 0.001 to 10 wt %, preferably of 0.01 to 1 wt %, more preferably of 0.05 to 0.5 wt % (% by dry weight) of the powder. These concentrations of the compound in the powder of the invention allow an easy application to a food product and to provide on one hand a practically colorless food product or food product surface before the baking or heating step, and on the other hand allow the food product or surface to develop a sufficiently satisfying color appearance after the heating step for example in a microwave oven.

The powder of the invention comprises a chemical base, wherein the chemical base is present in an amount of 5 to 40 wt %, preferably of 8 to 25 wt %, more preferably of 10 to 15 wt % (% by dry weight) of the powder. It has been observed that the presence of a chemical base together with the compound has a synergistic effect in further and faster developing the color reaction of the food product or at its surface upon heating. Hence, in selecting the appropriate concentrations of the chemical base versus said compound, the intensity and speed of the color development can be modified and optimized according to the individual specific food applications and preferences.

Another aspect of the invention relates to the use of the powder of the invention for coloring a food product or a food product surface when heated, and preferably when heated in a microwave oven. The food product, for which the powder of the invention is used, is to be heated. In a preferred embodiment, the surface of said food product is to be heated. Typically, such heating can be achieved in a conventional oven or by any other means of heating a product or its surface such as for example by exposing the product to a heating lamp or to an infrared heater. Preferably, the product of the invention is heated in a microwave oven.

It is mainly for food products intended to be heated for a short period of time only and at relative lower surface temperatures that the invention provides a good solution to surface coloring. Hence, the invention is advantageously applied on food products intended for being heated in a microwave oven. For example, food products comprising the powder of the present invention are heated for at least 2 min at 250 Watts or higher, preferably for at least 4 min at said Watts in a microwave oven. Alternatively, the food products are heated for 1 min and 20 seconds or longer in a microwave oven at 600 Watts or higher.

Advantageously, the powder of the invention is used for products which are intended to be heated in a microwave oven, for example in-home by a consumer. Upon heating in the microwave oven, the product would then develop a brownish color at the surface, typical of a well baked and appetizing product. Such brownish colors depend with the application, food product type, the concentration and choice of the compound and can result in a variety of different surface color aspects, reaching from violet, red, orange, golden-yellow, grey into blue.

A further aspect of the invention is a method for coloring a food product or a food product surface comprising the steps of adding the powder of the invention to the food product or food product surface and thereafter heating the food product or food product surface in an oven, preferably in a microwave oven. Thereby, the powder can be used directly in the preparation for making the food product prior to heating the product. This can be achieved by for example mixing the flour based powder directly into the dough composition during the preparation of a bread product. Upon heating of the product a color will develop through-out the body of the product and also at its surface, visible to a consumer.

On the other hand, a dough product can be produced in a conventional way and before a freezing or packaging step, the finished dough product can be dipped in or overlaid with some powder of the invention. This can be done by e.g. spreading or sprinkling some powder onto the surface of such a product e.g. directly after its production. Upon heating of the product, a nice brownish color will then develop at the treated surface of the food product.

A still further aspect relates to a food product comprising the powder of the invention. The food product accordingly pertains, but is not limited, to products selected from the group consisting of dough, bread, cookies, cereals, bakery products, pizzas, snacks, gratins, cooked pasta, lasagna, cheese and rice dishes, and meat.

In a preferred embodiment, the food product is a frozen food product. Ideally, the food product is already frozen when the powder of the invention is applied thereon. The food product is then thawed and baked directly in a microwave oven. Upon the heating, a nice brownish food surface color will develop. The inventors believe that it is an advantage of applying the powder of the invention to a frozen food product, because upon thawing and baking of a frozen product, usually moisture appears on the surface of the product. This moisture when in contact with the powder may actually help and enhance to color reaction at the food surface to take place.

Those skilled in the art will understand that they can freely combine all features of the present invention disclosed herein. In particular, features described for the product of the present invention may be combined with the use and/or method of the present invention, and vice versa. Further, features described for different embodiments of the present invention may be combined.

Further advantages and features of the present invention are apparent from the figures and examples.

Example 1

White wheat flour (from Moulins de Granges, Switzerland), rosemary extract with at least 4 wt % rosmarinic acid content (Martin Bauer Group, Germany) and sodium bicarbonate (Fluka, Switzerland) were mixed according to Table 1 and mortared to result in a homogeneous powder. Thereafter, an amount of each powder as indicated in Table 1 was regularly sprinkled onto the surface of raw cookie doughs with a diameter of 6.5 cm and then baked in a microwave oven for 1 min 20 seconds at 600 Watts. The samples of Trial 4 were baked in a microwave oven with a metallic susceptor.

TABLE 1

|  | Flour | R. extract | Bicarbonate | Powder/cookie |
|---|---|---|---|---|
| Trial 1 | 9 g | 0.15 g (1.5%) | 0.85 g (8.5%) | 0.23 g |
| Trial 2 | 9 g | 0.5 g (4.8%) | 0.85 g (8.2%) | 0.28 g |
| Trial 3 | 8 g | 1.0 g (10%) | 1.0 g (10%) | 0.26 g |
| Trial 4 | 8 g | 1.0 g (10%) | 1.0 g (10%) | 0.26 g |

A detailed color analysis of the baked cookie doughs was carried out using the CIELab* notation. In the International Commission on Illumination (CIE), a color is represented by a point in a color space. The coordinates of such a point are: the luminosity L (L=0: black, L=100: white), a* the amount of red and green (a* positive: red, a* negative: green), and b* the amount of yellow and blue (b* positive: yellow, b* negative: blue). Visual color changes were evaluated by calculating the Euclidean distance between the two points which described the color before and after testing. The distance is represented by the equation:

$$DEab^* = \sqrt{(L^*_2 - L^*_1)^2 + (a^*_2 - a^*_1) + (b^*_2 - b^*_1)^2}$$

The Color analysis was registered using a computer controlled digital camera system (DigiEye, Verivide) with a D65 light source.

The results are depicted in FIG. 1 and show the differences in the intensity of the obtained surface coloration as well as the colors per se of the treated cookies after baking depending on the composition of the powder of the invention applied to the surface of those cookies.

Example 2

7.5 g of white wheat flour (from Moulins de Granges, Switzerland), 1 g of onion extract (Martin Bauer Group, Germany) and 1.5 g of sodium bicarbonate (Fluka, Switzerland) were mixed and mortared to result in a homogeneous powder. Thereafter, around 1.1 g of the powder was regularly sprinkled onto the surface of a frozen dough bun and around 1.7 g onto the surface of a frozen toast bread of 100 cm². Then, the frozen dough bun and the toast bread were baked in a microwave oven respectively for 1 min 40 seconds and 1 min 30 seconds at 750 Watts. The toast bread were baked in a microwave oven with a metallic susceptor.

The Color analysis was registered using a computer controlled digital camera system (DigiEye, Verivide) with a D65 light source.

Figure 2:
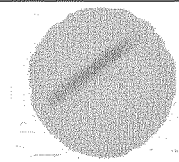
FIG. 2: Browning reaction of frozen dough products containing the powder of the invention at their surface before and after baking in a microwave oven.
Figure 2:
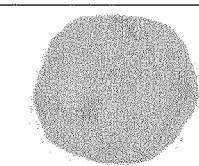
Figure 2:
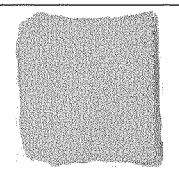
Figure 2:
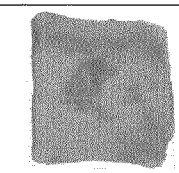
Figure 2:
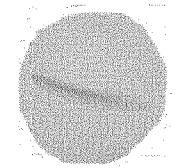
Figure 2:
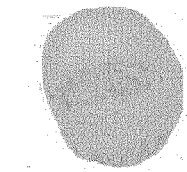

The results are depicted in FIG. 2 and show the differences in the intensity of the obtained surface coloration as well as the colors per se of the treated frozen food after baking. The browning is enhanced by the use of a metallic susceptor.

Example 3

7.5 g of white wheat flour (from Moulins de Granges, Switzerland), 1 g of onion extract (Martin Bauer Group, Germany), 1.5 g of sodium bicarbonate (Fluka, Switzerland) and 500 mg of zinc sulfate heptahydrate (Aldrich, USA) were mixed and mortared to result in a homogeneous powder. Thereafter, around 1.1 g of the powder was regularly sprinkled onto the surface of a frozen dough bun. Then, the frozen dough bun and the toast bread were baked in a microwave oven for 1 min 40 seconds at 750 Watts. The Color analysis was registered using a computer controlled digital camera system (DigiEye, Verivide) with a D65 light source.

The results are depicted in FIG. 2 and show the differences in the intensity of the obtained surface coloration as well as the colors per se of the treated frozen food after baking. The browning is enhanced by the use of a metallic susceptor.

The invention claimed is:

1. A powder for coloring a food product when the food product is heated or a surface of the food product when the food product is heated, the powder comprising:
   a chemical base that is 5 to 40 wt % of the powder;
   a carrier; and
   a plant extract comprising a compound with at least one aromatic ring having at least two hydroxyl groups borne by two adjacent carbon atoms of the at least one aromatic ring.

2. The powder of claim 1, wherein the compound is selected from the group consisting of catechin, epicatechin, (epi)catechin-gallate, caffeic acid, chlorogenic acid, rosmarinic acid, quercetin, caftaric acid and rutin.

3. The powder of claim 1, wherein the plant extract comprises 4-70 wt % of the compound.

4. The powder of claim 1, wherein the plant extract is an extract from a plant selected from the group consisting of tea, grape seed, onion, coffee, artichoke, chicory, rosemary, oregano, basil, apple, eggplant, grape, pear, plum, potato, sunflower, and combinations thereof.

5. The powder of claim 1, wherein the chemical base is selected from the group consisting of sodium bicarbonate, sodium or potassium hydroxide and calcium carbonate.

6. The powder of claim 1, wherein the carrier is flour.

7. The powder of claim 6, wherein the flour is selected from the group consisting of wheat, corn, rice, maize, buckwheat, chestnut, *quinoa* and soy flour.

8. The powder of claim 1, wherein the compound is present in an amount of 0.001 to 10 wt % of the powder.

9. The powder of claim 1, wherein the compound is present in an amount of 0.05 to 0.5 wt % of the powder.

10. The powder of claim 1, wherein the chemical base is present in an amount of 10 to 15 wt % of the powder.

11. A method for coloring a surface of a food product, the method comprising:
   adding to the surface of the food product a powder comprising a chemical base that is 5 to 40 wt % of the powder, a carrier, and a plant extract comprising a compound with at least one aromatic ring having at least two hydroxyl groups borne by two adjacent carbon atoms of the at least one aromatic ring; and
   thereafter heating the food product in an oven.

12. The method of claim 11, wherein the food product is heated in a microwave oven.

* * * * *